US010041606B2

(12) United States Patent
Schlekewy et al.

(10) Patent No.: US 10,041,606 B2
(45) Date of Patent: Aug. 7, 2018

(54) SPECIFIC GRAVITY VALVE

(75) Inventors: Dean Schlekewy, Fort Saskatchewan (CA); Wade Tokarek, Lloydminster (CA)

(73) Assignee: RECONECO INC., Lloydminster (CA)

( * ) Notice: Subject to any disclaimer, the term of this patent is extended or adjusted under 35 U.S.C. 154(b) by 0 days.

(21) Appl. No.: 13/363,437

(22) Filed: Feb. 1, 2012

(65) Prior Publication Data

US 2013/0087220 A1 Apr. 11, 2013

Related U.S. Application Data

(63) Continuation-in-part of application No. 13/296,441, filed on Nov. 15, 2011.

(30) Foreign Application Priority Data

Nov. 15, 2011 (CA) .................................. 2 755 406

(51) Int. Cl.
*F16K 31/18* (2006.01)
*F16K 31/20* (2006.01)
*F16K 31/28* (2006.01)

(52) U.S. Cl.
CPC .............. *F16K 31/20* (2013.01); *F16K 31/28* (2013.01); *Y10T 137/6004* (2015.04); *Y10T 137/7358* (2015.04)

(58) Field of Classification Search
CPC .......... F16K 31/20; F16K 31/22; F16K 31/28; B01D 17/0214; B01D 17/0217; E02B 15/045; Y10T 137/2947; Y10T 137/295; Y10T 137/3003; Y10T 137/3006; Y10T 137/3009; Y10T 137/3021; Y10T 137/3024; Y10T 137/3028; Y10T 137/3052; Y10T 137/4486; Y10T 137/4508; Y10T 137/7323; Y10T 137/7326; Y10T 137/7404; Y10T 137/741;

(Continued)

(56) References Cited

U.S. PATENT DOCUMENTS 140,262 A * 6/1873 Bristol ............................ 223/99
1,013,463 A * 1/1912 Tozier ........................... 137/398

(Continued)

FOREIGN PATENT DOCUMENTS

GB 292471 A * 9/1928 ............. F16K 31/22
GB 518346 2/1940
WO 2009069563 6/2009

*Primary Examiner* — Craig J Price
(74) *Attorney, Agent, or Firm* — Michael J. Bujold; Davis & Bujold P.L.L.C.

(57) ABSTRACT

A specific gravity valve, has a floating valve member with a specific gravity that is less than the specific gravity of a first liquid and greater than the specific gravity of a second, heavier liquid. A valve seat is associated with the floating valve member. A valve member retainer retains the floating valve member and permits limited vertical movement of the floating valve member between an open position away from the valve seat and a closed position engaged with the valve seat, such that in the open position, fluid flow through the respective outlet is permitted, and in the closed position, fluid flow through the respective outlet is prevented. The specific gravity valve may be used with a production tank to prevent an unintended draw off of the wrong fluid component in the tank.

6 Claims, 2 Drawing Sheets

(58) Field of Classification Search
CPC ....... Y10T 137/7866; Y10T 137/87877; Y10T 137/7358; Y10T 137/053; Y10T 137/6004; G05D 7/0146; G05D 7/01766; G05D 16/12
USPC ........ 137/160, 161, 177–179, 187, 171–173, 137/399, 398, 247.14, 247.23, 516.25, 137/883, 423, 425, 247.17; 222/64; 210/119, 121, 123, 134, 744, 115; 73/440, 221, 224, 311
See application file for complete search history.

(56) References Cited

U.S. PATENT DOCUMENTS

| | | | | |
|---|---|---|---|---|
| 1,750,489 | A * | 3/1930 | Pippin | 137/399 |
| 2,045,909 | A * | 6/1936 | Haralson | 137/399 |
| RE20,227 | E * | 1/1937 | Gordon | 210/511 |
| 2,407,180 | A * | 9/1946 | Shapiro et al. | 210/123 |
| 2,442,379 | A * | 6/1948 | Samiran | 210/115 |
| 2,935,195 | A | 5/1960 | Dunn | |
| 2,998,096 | A | 8/1961 | Snipes | |
| 3,115,888 | A * | 12/1963 | Moyer | 137/172 |
| 3,351,083 | A | 11/1967 | Sait | |
| 3,538,517 | A * | 11/1970 | De Laney et al. | 137/624.18 |
| 3,969,605 | A | 7/1976 | Danell | |
| 4,015,621 | A * | 4/1977 | Laxo | F16K 24/00 137/173 |
| 4,055,499 | A * | 10/1977 | Laxo | 210/119 |
| 4,420,392 | A * | 12/1983 | Harris | B01D 17/0208 210/114 |
| 4,436,630 | A * | 3/1984 | Anderson | 210/123 |
| 4,802,978 | A | 2/1989 | Schmit et al. | |
| 4,960,513 | A * | 10/1990 | Young | 210/123 |
| 5,149,344 | A * | 9/1992 | Macy | B01D 19/0042 166/267 |
| 5,161,564 | A | 11/1992 | Clark | |
| 5,730,872 | A | 3/1998 | Rhodes | |
| 6,860,921 | B2 * | 3/2005 | Hopper | E21B 43/38 166/105.5 |
| 7,243,673 | B2 * | 7/2007 | Liou | F16K 24/00 137/178 |
| 2016/0008742 | A1 * | 1/2016 | Adler | B01D 19/0063 96/157 |
| 2016/0121238 | A1 * | 5/2016 | Mills | B01D 17/0214 210/744 |

* cited by examiner

SPECIFIC GRAVITY VALVE

CROSS-REFERENCE TO RELATED APPLICATIONS

This is a continuation application of U.S. application Ser. No. 13/296,441 filed Nov. 15, 2011 entitled SPECIFIC GRAVITY VALVE.

FIELD

This relates to one or more specific gravity valves that detects the interface between two fluids, such as in a production tank and that may be used to only allow a selected fluid to flow, or prevents a particular fluid from flowing from the production tank.

BACKGROUND

Produced fluids from a hydrocarbon well include multiple components, the most common being gas, oil, water, and sand. It is common to store the produced fluids in one or more production tanks, where the components are allowed to at least partially separate. As the tank fills, it is necessary to draw off the fluids, such as by using a tank truck. As each component is treated separately, the tank truck is filled with one component at a time, and "mixed loads" are avoided whenever possible. Often there will be a water outlet toward the bottom of the tank, and an oil outlet that is a certain distance above the water outlet. This allows a tank truck to draw off either water or oil. However, as it may be difficult to tell what is being drawn off, or due to operator inattention, it is not uncommon for mixed loads to occur.

SUMMARY

According to an aspect, there is provided a specific gravity valve comprising a floating valve member having a specific gravity that is less than the specific gravity of a first liquid and greater than the specific gravity of a second, heavier liquid. A valve seat is associated with the floating valve member. A valve member retainer retains the floating valve member and permits limited vertical movement of the floating valve member between an open position away from the valve seat and a closed position engaged with the valve seat, such that in the open position, fluid flow through the respective outlet is permitted, and in the closed position, fluid flow through the respective outlet is prevented.

The floating valve member may be a ball, the valve seat may be a ball seat, and the valve member retainer may be a ball cage.

The floating valve member retainer may retain the floating valve member at a sufficient distance from the valve seat that the fluid velocity is greater than the terminal velocity of the floating valve member in the first liquid.

According to an aspect, there is provided a production tank and specific gravity valves in combination. The production tank has a tank body that retains produced fluids from a hydrocarbon producing well and has both an oil outlet and a water outlet. Specific gravity valves are mounted to each of the oil outlet and the water outlet. Each specific gravity valve has a floating valve member that has a specific gravity that is less than the specific gravity of water and greater than the specific gravity of oil. The floating valve member is associated with a valve seat. A valve member retainer retains the floating valve member and permits limited vertical movement of the floating valve member between an open position away from the valve seat and a closed position where the floating valve member directly engages the valve seat. When in the open position, fluid flow through the respective outlet is permitted, and when in the closed position, fluid flow through the respective outlet is prevented. On the oil outlet, the valve member retainer retains the floating valve member above the fluid outlet. On the water outlet, the valve member retainer retains the floating valve member below the fluid outlet.

Different types of specific gravity valves may be mounted at the oil and water outlet, however, according to an aspect, the floating valve member may be a ball, the valve seat may be a ball seat, and the valve member retainer may be a ball cage.

The floating valve member has a terminal velocity in each of the oil and the water. According to an aspect, the valve member retainer may retain the floating valve member at a sufficient distance from the respective outlet that the fluid velocity is greater than the terminal velocity of the floating valve member in the respective fluid.

According to an aspect, there is provided a method of controlling the fluid flow from a production tank. The production tank has a tank body that retains produced fluids from a hydrocarbon producing well, an oil outlet, and a water outlet. The method of controlling the fluid flow includes the step of mounting a specific gravity valve to each of the oil outlet and the water outlet. Each specific gravity valve includes a ball that has a specific gravity that is less than the specific gravity of water and greater than the specific gravity of oil. A ball seat is associated with the ball and a ball retainer retains the ball and permits limited vertical movement of the ball between an open position away from the ball seat and a closed position engaged with the ball seat. In the open position, fluid flow through the respective outlet is permitted, and in the closed position, fluid flow through the respective outlet is prevented. On the oil outlet, the ball retainer retains the ball above the fluid outlet, and on the water outlet, the ball retainer retains the ball below the fluid outlet.

According to another aspect, there is provided a liquid container, comprising a first liquid having a first specific gravity and a second liquid having a second specific gravity that is greater than the first liquid. There is at least one liquid outlet with a specific gravity valve as described above in communication with the liquid outlet.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
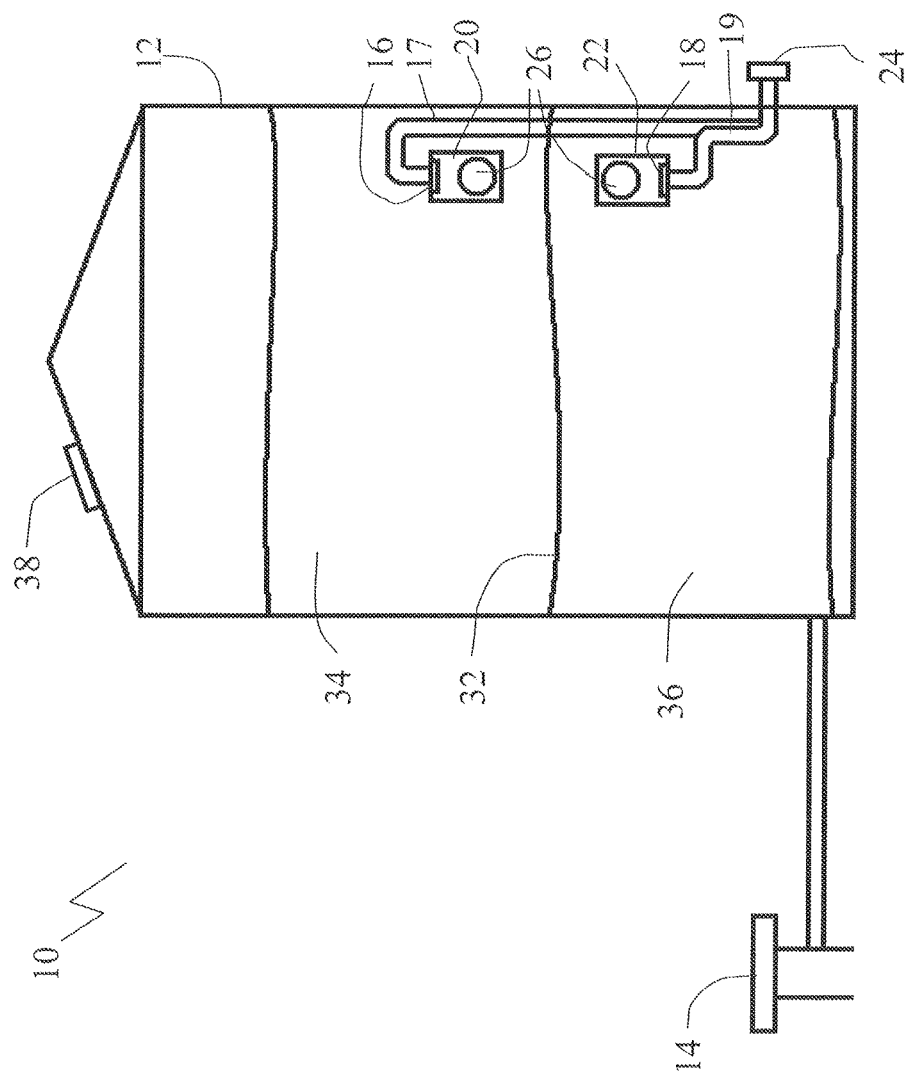
FIG. 1 is a schematic view of a production tank with specific gravity valves.
Figure 2:
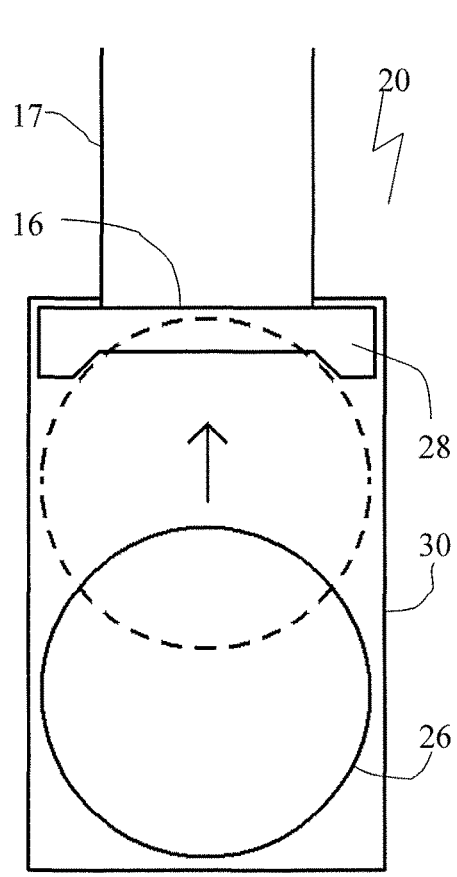
FIG. 2 is a side elevation view of a specific gravity valve for detecting a heavier liquid such as may be found on an oil outlet.
Figure 3:
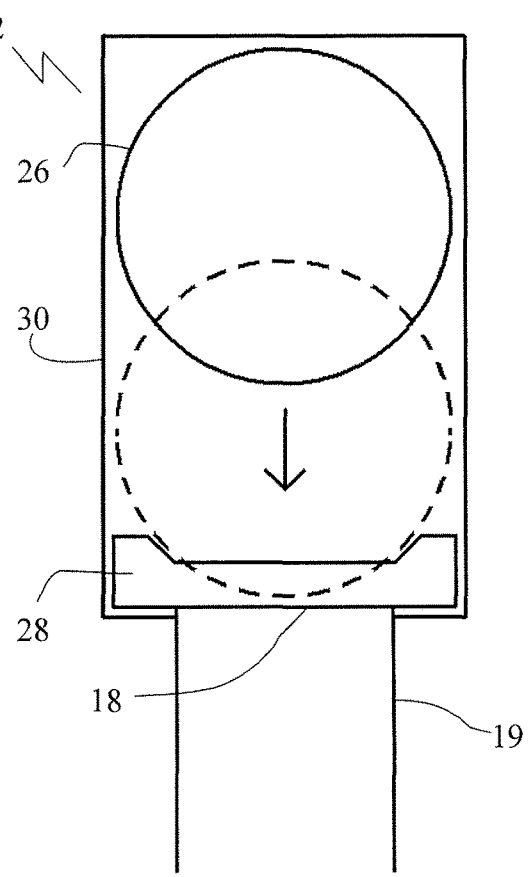
FIG. 3 is a side elevation view of a specific gravity valve for detecting a lighter liquid such as may be found on a water outlet.

Referring to FIGS. 2 and 3, there is shown specific gravity valves 20 and 22. Specific gravity valves 20 and 22 are used to detect the interface between two separate liquids, such as immiscible liquids. By orienting valves 20 and 22 differently, valves 20 and 22 are able to be opened or closed, depending on whether the lighter fluid must be present, or must not be present. In FIG. 2, valve 20 will close if the fluid level of the lower, heavier fluid rises up to the level of valve 20. In FIG. 3, valve 22 will close if the level of the lighter fluid drops below the level of valve 22. Valves 20 and 22 will now be described with respect to their use in a production tank as shown in FIG. 1 to prevent oil from being drawn off the water outlet, and water from being drawn off the oil outlet. However, it will be understood that this is only one example and valves 20 and 22 may be used in other situations where it is necessary to detect the interface between two liquids with different specific gravities.

Referring to FIG. 1, there will now be described a production tank, generally indicated by reference numeral 10 that has a tank body 12 that retains produced fluids from a hydrocarbon producing well 14, an oil outlet 16 on an oil conduit 17, and a water outlet 18 on a water conduit 19. As will be understood by those skilled in the art, production tank 10 may have other connections and components such as vent 38 (diagrammatically shown), and other elements that are not shown such as additional vents, heater tubes, etc., and that the components described herein are limited to those necessary to understand the presently described method and apparatus.

Specific gravity valves 20 and 22 are mounted to each of the oil outlet 16 and water outlet 18, respectively. As oil has a specific gravity that is less than water, oil outlet 16 is positioned a certain distance above water outlet 18 to allow a tank truck, or other fluid transport vehicle or device, to connect to the appropriate outlet and draw off the desired fluid. While outlets 16 and 18 are positioned at different levels in tank body 12, the connection points 24 are generally at the same location for ease of access of the operators.

Referring to FIGS. 2 and 3, each specific gravity valve 20 and 22 includes a floating valve member 26 having a specific gravity that is less than the specific gravity of water and greater than the specific gravity of oil. This allows it to float at the interface 32 between water and oil, or to sink in or and float in water, as the case may be. Specific gravity valve 20 also has a valve seat 28 associated with floating valve member 26. Valve seat 28 is positioned such that it surrounds or covers the respective outlet 16 or 18. When engaged by floating valve member 26, fluid flow through the respective outlet 16 or 18 is prevented. The position and movement of valve member 26 is controlled by a valve member retainer 30. Valve member retainer 30 retains floating valve member 26 and is oriented such that it permits vertical movement of floating valve member 26 within certain limits. When oil/water interface 32 is above or below valve member retainer 30, valve member 26 will be at the top or bottom of valve member retainer 30, respectively. In this manner, it allows floating valve member 26 to move between an open position away from valve seat 28, and a closed position where floating valve member 26 directly engages valve seat 28. In the open position, fluid flow through outlet 16 or 18 is permitted, and in the closed position, fluid flow through outlet 16 or 18 is prevented. As depicted, the floating valve member 26 may be a ball, valve seat 28 may be a ball seat, and valve member retainer 30 may be a ball cage. Other designs may also be used as will be recognized by those skilled in the art. In particular, it may be that a particular design for floating valve member 26 results in more responsiveness and reliability in floating on interface 32 between oil and water. However, the ball and cage design as depicted represents an economical design that gives adequate results in many circumstances.

Referring to FIG. 1 through 3, on oil outlet 16, valve member retainer 30 retains floating valve member 26 above oil outlet 16, and on water outlet 18, valve member retainer 30 retains floating valve member 26 below fluid outlet 18. During normal operation, interface 32 will be between oil outlet 16 and water outlet 18. As floating valve member 26 will float on water and sink in oil, in oil layer 34, valve member 26 is at the bottom of valve member retainer 30 and in water 36, valve member 26 is at the top of valve member retainer 30. When oil/water interface 32 rises above oil outlet 16, valve member 26 will be carried up by water layer 36 and will close against valve seat 28 in specific gravity valve 20. When oil/water interface drops below water outlet 18, valve member 26 will close against valve seat 28 in specific gravity valve 22.

As fluid is drawn out of the tank, there will be a certain suction pressure and resulting fluid velocity applied close to the respective outlet 16 or 18. In order to prevent specific gravity valve 20 or 22 from closing due to this fluid velocity rather than the level of oil/water interface 32, the terminal velocity (settling or surfacing rate through the respective fluid) in each of the oil and the water and the size of the valve member retainer may be designed or determined such that floating valve member 26 is maintained at a distance where the fluid velocity of the fluid being drawn off will not overcome the terminal velocity of the valve member and cause specific gravity valve 20 or 22 to close when not required.

As described previously, valves 20 and 22 are described in the context of an oil production tank, but may also be used in other situations to detect other liquid interfaces between separate fluids with different specific gravities. For example, a specific gravity valve may be used in another type of tank that only requires a valve on only one outlet, or may be used in tanks that have multiple liquid interfaces and that requires two or more valves. In each situation, valve member 26 must be weighted appropriately to ensure it will float at the interface, although the valve retainer generally retains it in close proximity to the valve seat, and therefore prevents it from floating at the interface.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples, but should be given the broadest interpretation consistent with the description as a whole.

What is claimed is:

1. In combination, a production tank and specific gravity valves,
   the production tank comprising:
      a tank body that retains produced fluids comprising at least oil and water from a hydrocarbon producing well, the tank body having a top and a bottom;
      an inlet that allows the produced fluids to be introduced to the tank body;

an oil outlet that is separate and distinct from the inlet, the oil outlet being positioned within the tank at a height that is below the top of the tank, the oil outlet feeding fluid to an oil outlet pipe that extends out of the tank from the oil outlet such that during operation the oil outlet draws fluid out of the tank body down to a liquid level defined by the height of the oil outlet, the oil outlet being gravity fed such that a level of the produced fluids that is within the production tank and above the oil outlet is reduced; and a water outlet that is separate and distinct from the inlet, the water outlet being positioned at a height that is below the oil outlet and above the bottom of the tank body such that during operation the water outlet draws fluid out of the tank body down to a liquid level defined by the height of the water outlet;

a first specific gravity valve mounted to the oil outlet and a second specific gravity valve mounted to the water outlet, each specific gravity valve comprising:

a floating valve member having a specific gravity that is less than the specific gravity of water and greater than the specific gravity of oil;

a valve seat associated with the floating valve member;

a valve member retainer that retains the floating valve member and permits limited vertical movement of the floating valve member between an open position away from the valve seat and a closed position where the floating valve member directly engages the valve seat, such that in the open position, fluid flow through the respective outlet is permitted, and in the closed position, fluid flow through the respective outlet is prevented;

a vent that equalizes gas pressure within the tank body to atmospheric pressure;

wherein, on the oil outlet, the valve member retainer for the oil outlet retains the floating valve member below the oil outlet, and on the water outlet, the valve member retainer for the water outlet retains the floating valve member above the water outlet.

2. The combination of claim 1, wherein the floating valve member is a ball, the valve seat is a ball seat, and the valve member retainer is a ball cage.

3. The combination of claim 1, wherein the floating valve member has a terminal velocity in each of the oil and the water, and the valve member retainer retains the floating valve member at a sufficient distance from the respective outlet that the fluid velocity is greater than the terminal velocity of the floating valve member in the respective produced fluid.

4. A method of controlling a fluid flow from a production tank, the production tank comprising a tank body that retains produced fluids comprising at least oil and water from a hydrocarbon producing well, a vent that equalizes gas pressure within the tank body to atmospheric pressure, a production fluid inlet, an oil outlet, and a water outlet, the method comprising the steps of:

mounting a specific gravity valve to each of the oil outlet and the water outlet, each specific gravity valve comprising a ball having a specific gravity that is less than the specific gravity of water and greater than the specific gravity of oil, a ball seat associated with the ball, and a ball retainer that retains the ball and permits limited vertical movement of the ball between an open position away from the ball seat and a closed position engaged with the ball seat, the ball seat comprising a fluid flow passage passing through the ball seat such that in the open position, fluid flow through the respective outlet is permitted, and in the closed position, fluid flow through the respective outlet is prevented;

wherein the oil outlet is positioned at a height that is below the top of the tank and the water outlet is positioned at a height that is below the oil outlet and above the bottom of the tank;

wherein, on the oil outlet, the ball retainer retains the ball below the oil outlet, and on the water outlet, the ball retainer retains the ball above the water outlet;

flowing fluids from the hydrocarbon producing well directly into the production tank such that a level of produced fluids within the production tank is above the oil outlet; and permitting the oil to flow out of the production tank by force of gravity through the fluid flow passage of the specific gravity valve of the oil outlet such that the level of produced fluids within the production tank is reduced.

5. The method of claim 4, wherein the floating valve member is a ball, the valve seat is a ball seat, and the valve member retainer is a ball cage.

6. The method of claim 4, wherein the floating valve member has a terminal velocity in each of the oil and the water, and the valve member retainer retains the floating valve member at a sufficient distance from the respective outlet that the fluid velocity is greater than the terminal velocity of the floating valve member in the respective produced fluid.

* * * * *